US012127900B1

(12) United States Patent
Liu

(10) Patent No.: US 12,127,900 B1
(45) Date of Patent: Oct. 29, 2024

(54) ELECTRIC TOOTHBRUSH ROTATING REPLACEMENT HEAD DEVICE

(71) Applicant: Hanwu Liu, Gaozhou (CN)

(72) Inventor: Hanwu Liu, Gaozhou (CN)

( * ) Notice: Subject to any disclaimer, the term of this patent is extended or adjusted under 35 U.S.C. 154(b) by 0 days.

(21) Appl. No.: 18/391,744

(22) Filed: Dec. 21, 2023

(51) Int. Cl.
| *A61C 17/34* | (2006.01) |
| *A46B 5/00* | (2006.01) |
| *A46B 13/02* | (2006.01) |
| *A61C 17/22* | (2006.01) |
| *A46B 9/04* | (2006.01) |
| *A46B 13/00* | (2006.01) |

(52) U.S. Cl.
CPC ........ *A61C 17/3436* (2013.01); *A46B 5/0095* (2013.01); *A46B 13/02* (2013.01); *A61C 17/222* (2013.01); *A61C 17/34* (2013.01); *A46B 9/04* (2013.01); *A46B 13/008* (2013.01); *A61C 17/22* (2013.01); *A61C 17/3427* (2013.01); *A61C 17/349* (2013.01)

(58) Field of Classification Search
CPC ..... A46B 5/0095; A46B 13/02; A61C 17/222; A61C 17/3436; A61C 17/34
See application file for complete search history.

(56) References Cited

U.S. PATENT DOCUMENTS

| 6,836,917 B2 * | 1/2005 | Blaustein | A61C 17/222 |
| | | | 15/28 |
| 11,207,162 B1 * | 12/2021 | Liu | A61C 17/26 |
| 11,896,116 B1 * | 2/2024 | Li | A61C 17/26 |
| 2011/0138562 A1 * | 6/2011 | Jungnickel | A61C 17/222 |
| | | | 15/167.1 |
| 2020/0038159 A1 * | 2/2020 | Scherrer | A61C 17/3436 |

FOREIGN PATENT DOCUMENTS

| DE | 4218417 A1 * | 12/1993 | A61C 17/22 |
| WO | WO 2004/098444 A1 * | 11/2004 | A61C 17/34 |

* cited by examiner

*Primary Examiner* — Laura C Guidotti
(74) *Attorney, Agent, or Firm* — WPAT, P.C

(57) ABSTRACT

An electric toothbrush rotating replacement head device includes: a toothbrush replacement head body including a toothbrush handle and a toothbrush head. The toothbrush handle defines a cavity, and the toothbrush head is disposed on a top of the cavity. A rotating shaft is disposed in the cavity. The toothbrush head includes: a bristle combination body. A shape of the bristle combination body corresponds to a shape of the toothbrush head. The bristle combination body includes: a first lug boss and a pin, the first lug boss defines a pin installation hole, and the pin is in an interference fit with the pin installation hole. A top edge of the first lug boss is provided with a bristle limiting bone, and a bottom of the first lug boss is provided with a driven gear. The rotating shaft is provided with a driving gear meshed with the driven gear.

15 Claims, 11 Drawing Sheets

ELECTRIC TOOTHBRUSH ROTATING REPLACEMENT HEAD DEVICE

TECHNICAL FIELD

The disclosure relates to the technical field of electric toothbrushes, and particularly to an electric toothbrush rotating replacement head device.

BACKGROUND

An electric toothbrush usually has a removable and replaceable attached brush, also known as "replacement head", so that a handle of the electric toothbrush can be used by multiple family members, and each family member can own an independent personal replacement head. Moreover, when a brush head needs to be replaced, such as the brush head is worn, only the replacement head needs to be replaced instead of replacing the entire electric toothbrush including the handle.

During a process of brushing teeth, various forces generated during the process of brushing teeth must be transmitted through a connection between the replacement head and the handle. These forces specifically include cleaning, driving, axial and radial forces acting on the replacement head and/or the handle. The connection between the replacement head and the handle is usually realized in a manner that the radial force is absorbed or dissipated in the handle as well as the axial force is absorbed or dissipated in a driving shaft. Therefore, a tubular connection part of the replacement head is usually pushed onto a connection rod or a neck of the toothbrush, and a drive shaft provided in a brush tube of the replacement head is connected to a drive shaft protruding from an end of the connection rod of the handle.

The electric toothbrush is widely used due to its high efficiency, portability, and good cleaning effect. Most of the existing electric toothbrushes drive the brush head to vibrate through a rapid rotation of a motor, so as to ensure a good cleaning effect. However, an internal structure of the existing electric toothbrush is complex, too many assembly parts bring corresponding cost during the production of the electric toothbrush, and a damage rate of the electric toothbrush is high. In addition, the high-speed rotation of the motor drives the brush head to vibrate through a transmission assembly, and the instability of the internal structure is easy to cause structure damages, thereby affecting a normal use of the electric toothbrush and causing a poor tooth cleaning effect.

At present, the electric toothbrush on the market is difficult to be flexibly removed and replaced the brush head device, and it is very inflexible and inconvenient to replace the toothbrush head. Therefore, consumers hope to have an electric toothbrush that is more convenient to use, more flexible to install and disassemble, and has a better tooth cleaning effect.

SUMMARY

A main purpose of the disclosure is to provide an electric toothbrush rotating replacement head device, which has advantages of simple structure, more flexible installation and disassembly, more convenient use, better tooth cleaning effect and multiple functions.

In order to achieve the above purpose, the disclosure provides an electric toothbrush rotating replacement head device, the device includes a toothbrush replacement head body. The toothbrush replacement body includes a toothbrush handle and a toothbrush head. The toothbrush handle defines a cavity, and the toothbrush head is disposed on a top of the cavity. A rotating shaft is disposed in the cavity. The toothbrush head includes a bristle combination body. A shape of the bristle combination body corresponds to a shape of the toothbrush head. The bristle combination body includes a first lug boss and a pin, and the first lug boss defines a pin installation hole. The pin is in an interference fit with the pin installation hole. A top edge of the first lug boss is provided with a bristle limiting bone, and a bottom of the first lug boss is provided with a driven gear. A top of the rotating shaft is provided with a driving gear, and the driving gear is meshed with the driven gear.

In an embodiment, the bristle combination body further includes a positioning step, and the first lug boss is disposed on the positioning step.

In an embodiment, the bristle combination body further includes a bristle top cover and a bristle bottom cover. The bristle top cover defines bristle holes. The bristle bottom cover defines a glue-overflow groove.

In an embodiment, the driving gear disposed on the top of the rotating shaft includes a first tooth column and a second tooth column. The driving gear defines a tooth groove between the first tooth column and the second tooth column. The driven gear is meshed with the rotating shaft through the tooth groove.

In an embodiment, the top of the rotating shaft is provided with a rotating pivot, and the rotating pivot is disposed below the driving gear.

In an embodiment, a top of the toothbrush handle defines a pivot hole therein, and the rotating pivot is disposed in the pivot hole.

In an embodiment, the rotating shaft is provided with an elastic sheet, and the elastic sheet is provided with an elastic protrusion.

In an embodiment, a central position of a lower part of the rotating shaft defines a main shaft installation hole, and the main shaft installation hole is configured to install a main shaft of a main engine.

In an embodiment, two sides of a bottom of the rotating shaft are respectively provided with a first limiting bone and a second limiting bone.

In an embodiment, a top of the toothbrush handle defines a top cavity, a second lug boss is disposed in the top cavity, and the second lug boss defines a pin through hole. An upper part of the top cavity is provided with a third limiting bone and a fourth limiting bone, and the bristle limiting bone is disposed between the third limiting bone and the fourth limiting bone.

In an embodiment, the top of the toothbrush handle defines a groove located at a back of the top cavity, and the groove corresponds to the second lug boss in position.

In an embodiment, two sides of the groove are provided with a first drainage hole and a second drainage hole respectively.

In an embodiment, a lower part of the toothbrush handle defines a first buckle hole and a second buckle hole.

In an embodiment, a bottom of the toothbrush handle is provided with a tail plug, and the tail plug is provided with a first limiting block and a second limiting block. The first limiting block corresponds to the first limiting bone in position, the second limiting block corresponds to the second limiting bone in position, the first limiting block is snapped with the first limiting bone, and the second limiting block is snapped with the second limiting bone.

In an embodiment, the tail plug includes a first elastic sheet and a second elastic sheet. The first elastic sheet is snapped with the bottom of the toothbrush handle through the first buckle hole, and the second elastic sheet is snapped with the bottom of the toothbrush handle through the second buckle hole.

The beneficial technical effects of the disclosure are as follows.

1) In the disclosure, the driving gear of the toothbrush handle is meshed with the driven gear of the toothbrush head, so that the rotating shaft can drive the toothbrush head to rotate. Compared with structures using main shaft magnets to provide power, the disclosure has simple structures and stable motion.

2) The disclosure achieves a stable connection through the interference fit between the stainless steel pin and the bristle combination body, and the stainless steel pin is in a precise fit with the pin through hole of the brush handle, which effectively improves the stability of the rotation motion and reduces the working noise.

3) The disclosure drives the bristle combination body through gear-like structures to drive the bristles to move and clean teeth. The disclosure has simple structures, stable motion and a strong cleaning effect.

4) The bristles of the disclosure are planted by using the copper-free bristle planting process, so that the rusting pollution caused by copper strips is reduced by the copper-free bristle planting process, which is more health to human.

BRIEF DESCRIPTION OF DRAWINGS

In order to provide a clearer explanation of embodiments of the disclosure or the technical solution in the related art, a brief description will be given to the attached drawings required in the description of the embodiments or the related art. It is apparent that the attached drawings in the following description are only some embodiments of the disclosure. For those ordinary skilled in the art, other attached drawings can be obtained based on structures shown in these drawings without any creative work.

Figure 1:
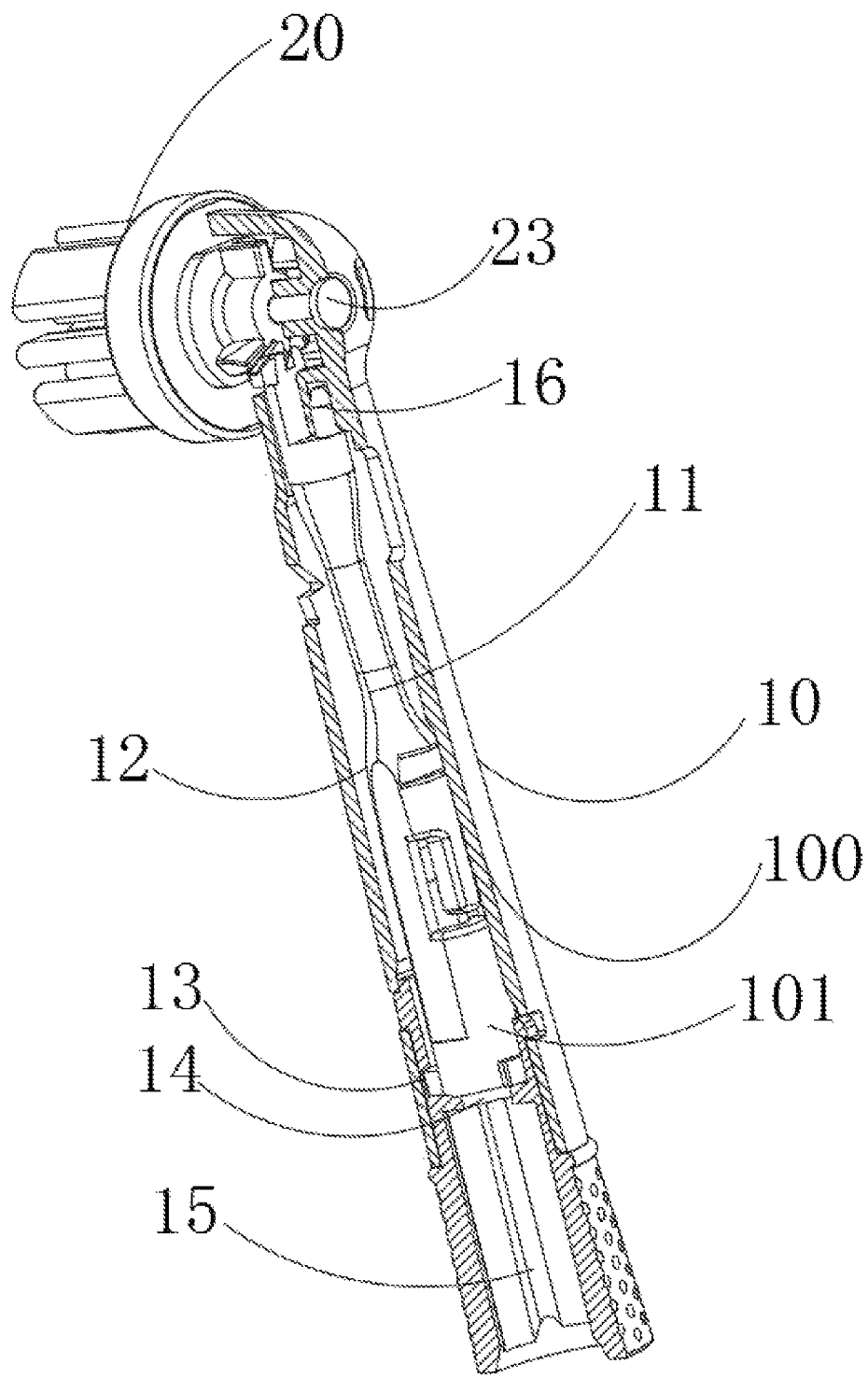
FIG. 1 illustrates a structural schematic diagram of an electric toothbrush rotating replacement head device according to an embodiment of the disclosure.
Figure 2:
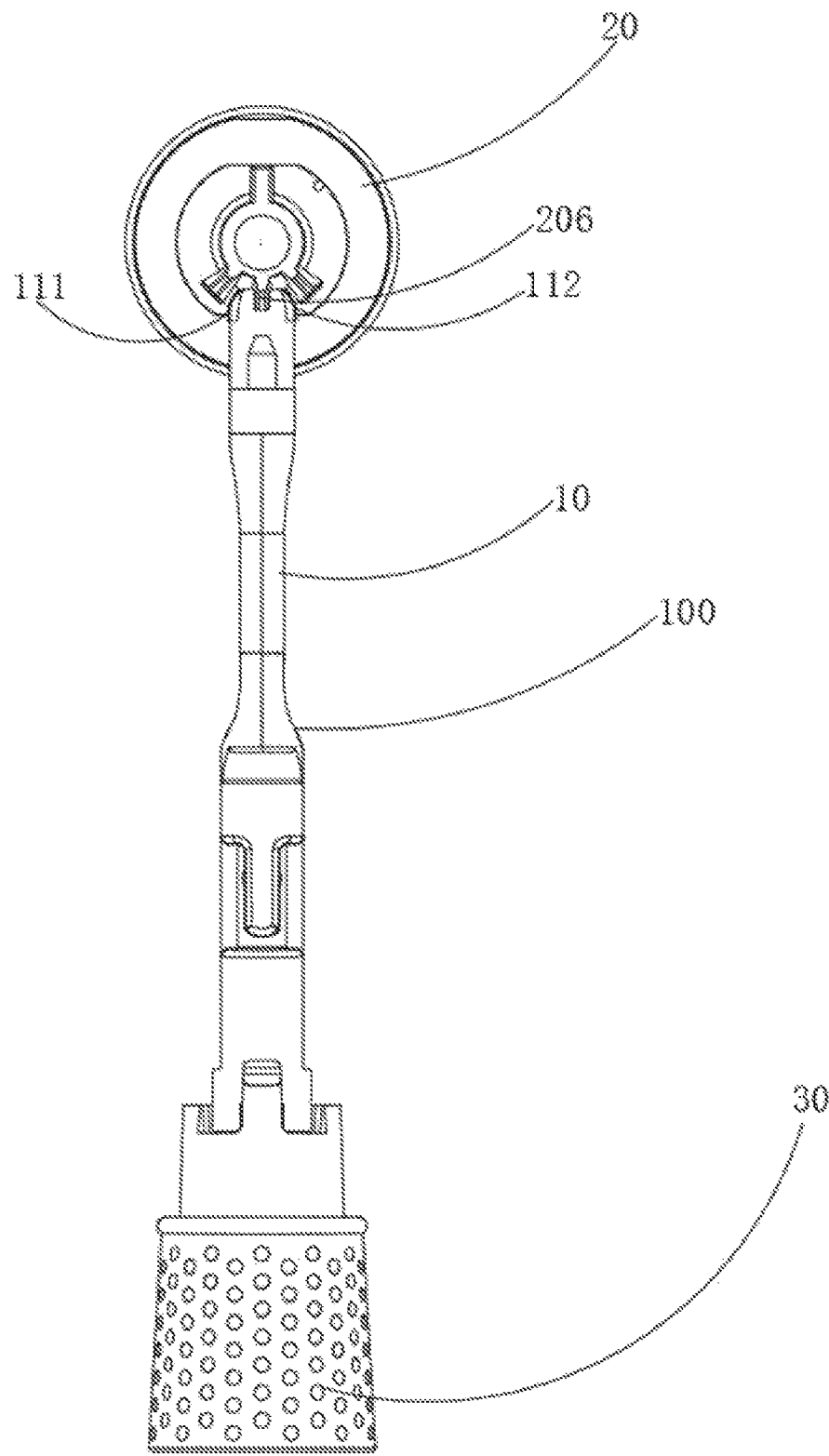
FIG. 2 illustrates another structural schematic diagram of the electric toothbrush rotating replacement head device according to the embodiment of the disclosure.

The implementation, functional features, and advantages of the disclosure will be further explained in conjunction with the embodiments, with reference to the attached drawings.

DETAILED DESCRIPTION OF EMBODIMENTS

The following will provide a clear and complete description of the technical solutions in the embodiments of the disclosure in conjunction with the attached drawings. Apparently, the described embodiments are only parts of the embodiments of the disclosure, not all of them. Based on the embodiments in the disclosure, all other embodiments obtained by those ordinary skilled in the art without creative work should fall within the scope of protection of the disclosure.

It should be noted that all directional indications (such as up, down, left, right, front, and back) in the embodiments of the disclosure are only used to explain the relative position relationship, motion situation, etc. between components in a specific posture (as shown in the attached drawings). If the specific posture changes, the directional indication also changes accordingly.

In the disclosure, unless clearly defined and limited, the terms "connect", "fix", etc. should be understood in a broad sense, for example, "fix" can be a fixed connection, a detachable connection, or an integrated connection; it can be a mechanical connection or an electrical connection; it can be a direct connection or indirect connection achieved through an intermediate medium, it can be an internal connection between two components or an interactive relationship between two components. For those ordinary skilled in the art, the specific meanings of the above terms in the disclosure can be understood based on specific situations.

In addition, if there are descriptions of "first", "second", etc. in the embodiments of the disclosure, the descriptions of "first", "second", etc. are only used for a purpose of description and cannot be understood as indicating or implying their relative importance or implying the number of indicated technical features. Therefore, features limited with "first" and "second" can explicitly or implicitly include at least one of the features. In addition, the meaning of "and/or" in the disclosure includes three parallel schemes. Taking "A and/or B" as an example, it includes scheme A, scheme B, or a scheme including both A and B. In addition, technical solutions among various embodiments can be combined with each other, but must be based on the ability of those ordinary skilled in the art to achieve. When the combination of the technical solutions conflicts or cannot be achieved, it should be considered that the combination of the technical solutions does not exist and is not within the scope of protection required by the disclosure.

The disclosure provides an electric toothbrush rotating replacement head device.

Referring to FIG. 1 to FIG. 10, in an embodiment of the disclosure, the electric toothbrush rotating replacement head device includes: a toothbrush replacement head body 100, the toothbrush replacement head body 100 includes: a toothbrush handle 10 and a toothbrush head 20, and the toothbrush handle 10 defines a cavity 101. Preferably, two ends of the cavity 101 are opened.

The toothbrush head 20 is disposed on a top of the cavity 101. A rotating shaft 11 is disposed in the cavity 101. The toothbrush head 20 includes: a bristle combination body 201. A shape of the bristle combination body 201 corresponds to a shape of the toothbrush head 20. The bristle combination body 201 includes: a first lug boss 202. The first lug boss 202 defines a pin installation hole 203. The bristle combination body 201 further includes: a pin 23, and the pin 23 is in an interference fit with the pin installation hole 203. A top edge of the first lug boss 202 is provided with a bristle limiting bone 204, and a bottom of the first lug boss 202 is provided with a driven gear 206.

A top of the rotating shaft 11 is provided with a driving gear 102, and the driving gear 102 is meshed with the driven gear 206.

In the embodiment, the toothbrush replacement head body 100 includes: the bristle combination body 201, the rotating shaft 11, the toothbrush handle 10, the toothbrush head 20, and the pin 23.

In the embodiment, the toothbrush replacement head body 100 is driven by a main engine 40. Specifically, the main engine 40 drives the rotating shaft 11 to rotate, thereby to drive the bristle combination body 201 to rotate around the pin 23, so that bristles 214 on the bristle combination body 201 can clean teeth.

The first lug boss 202 is provided the driven gear 206, and the driven gear 206 is meshed with the driving gear 102, so that the bristle combination body 201 can be driven by the rotating shaft 11.

In the embodiment, the toothbrush handle 10 is a tubular structure with the cavity 101 inside. Preferably, two ends of the cavity 101 are opened. The cavity 101 is configured for installing the rotating shaft 11. The cavity 101 defines a rotating shaft installation cavity 12. The top of the rotating shaft 11 extends to a back of the toothbrush head 20. The toothbrush head 20 is installed on an upper opening (i.e., the top of the cavity 101) of the toothbrush handle 10. The disclosure is different from most methods of planting bristles through copper sheets on the market. The toothbrush head 20 uses a copper-free bristle planting process to avoid rusting pollution of the copper sheets, reduce bacterial growth, and ensure safety and hygiene.

In the embodiment, the first lug boss 202 of the bristle combination body 201 defines the pin installation hole 203. A diameter of the pin installation hole 203 may be 1.35 millimeters (mm), and the pin 23 is in an interference fit with the pin installation hole 203. A diameter of the pin 23 may be 1.4 mm. A part of the pin 23 is designed with multi-layer reverse buckles to fixed in the pin installation hole 203, thereby preventing the bristle combination body 201 detaching from the toothbrush handle 10 during rotation operation.

Figure 8:
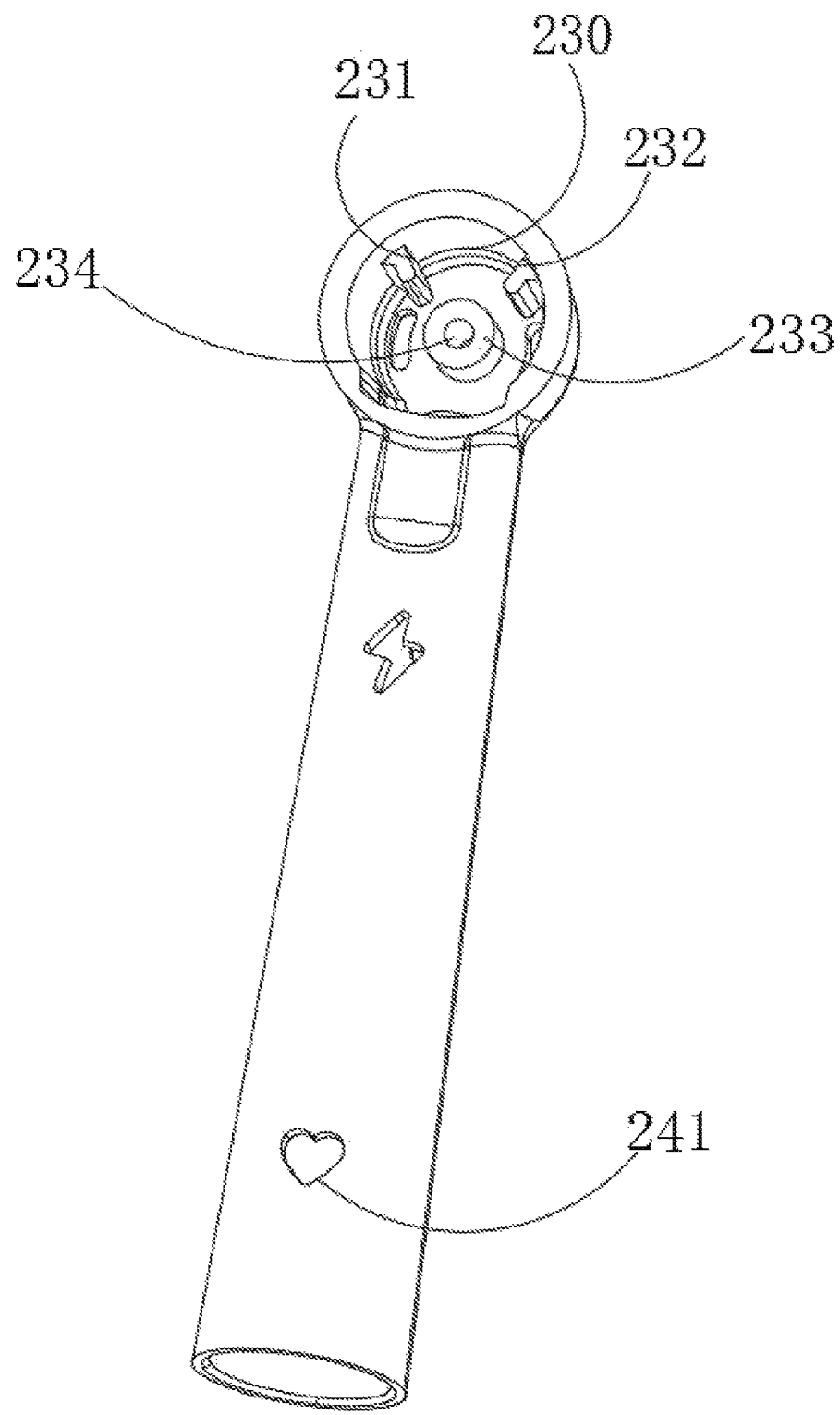
FIG. 8 illustrates a structural schematic diagram of a toothbrush handle of the electric toothbrush rotating replacement head device according to the embodiment of the disclosure.
Figure 9:
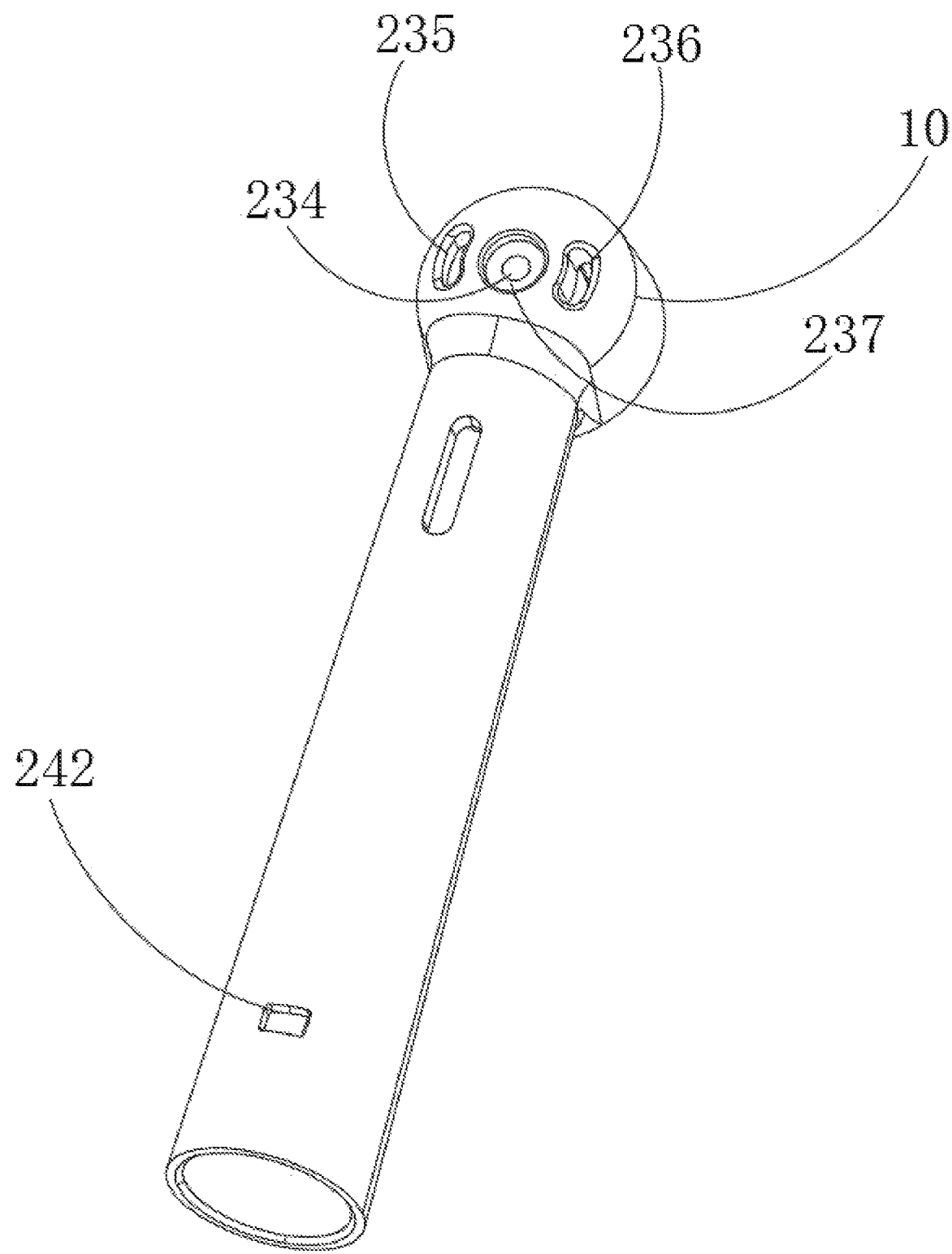
FIG. 9 illustrates another structural schematic diagram of the toothbrush handle of the electric toothbrush rotating replacement head device according to the embodiment of the disclosure.
Figure 10:
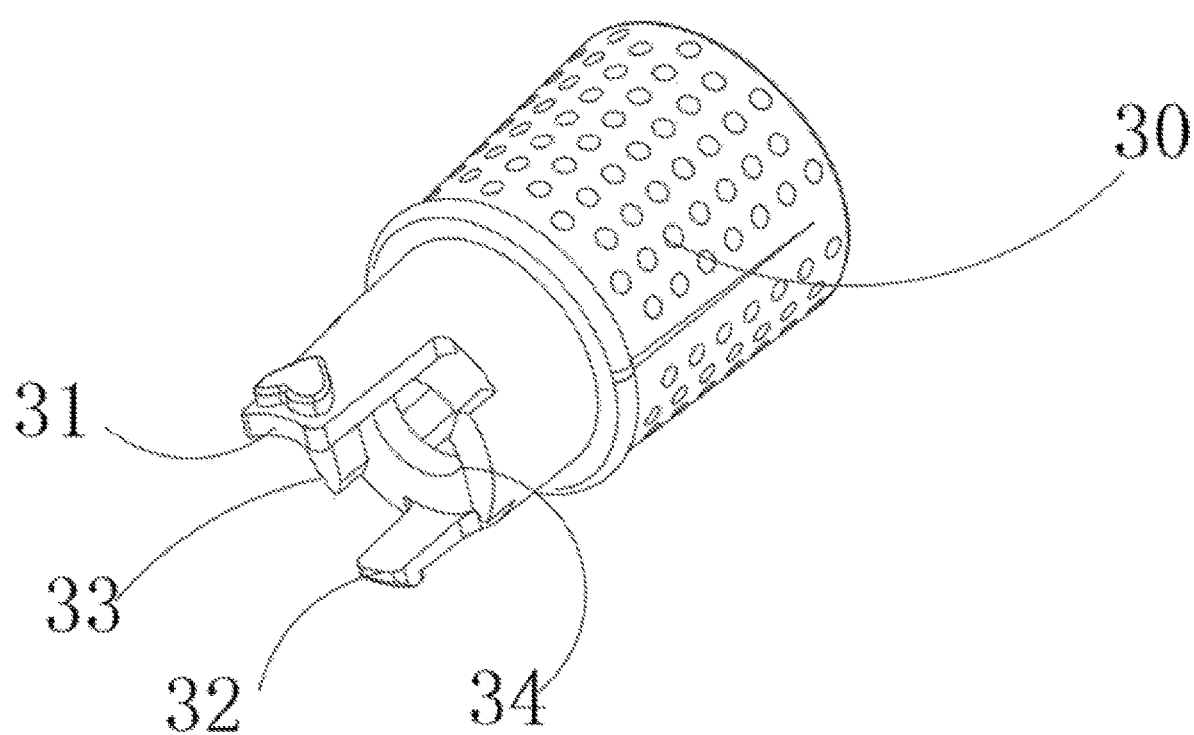
FIG. 10 illustrates a structural schematic diagram of a tail plug of the electric toothbrush rotating replacement head device according to the embodiment of the disclosure.
Figure 11:
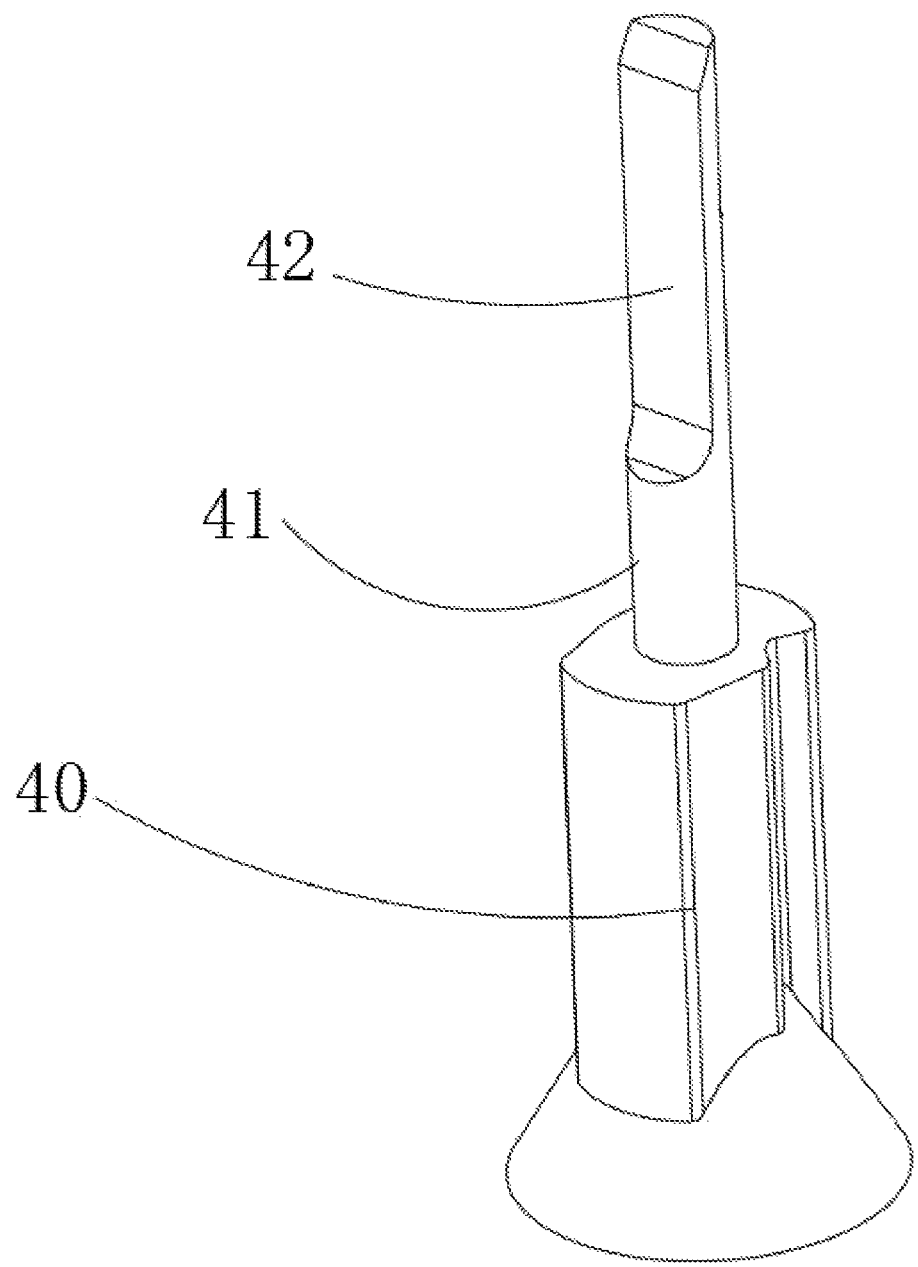
FIG. 11 illustrates a structural schematic diagram of a main engine according to the embodiment of the disclosure.
Figure 12:
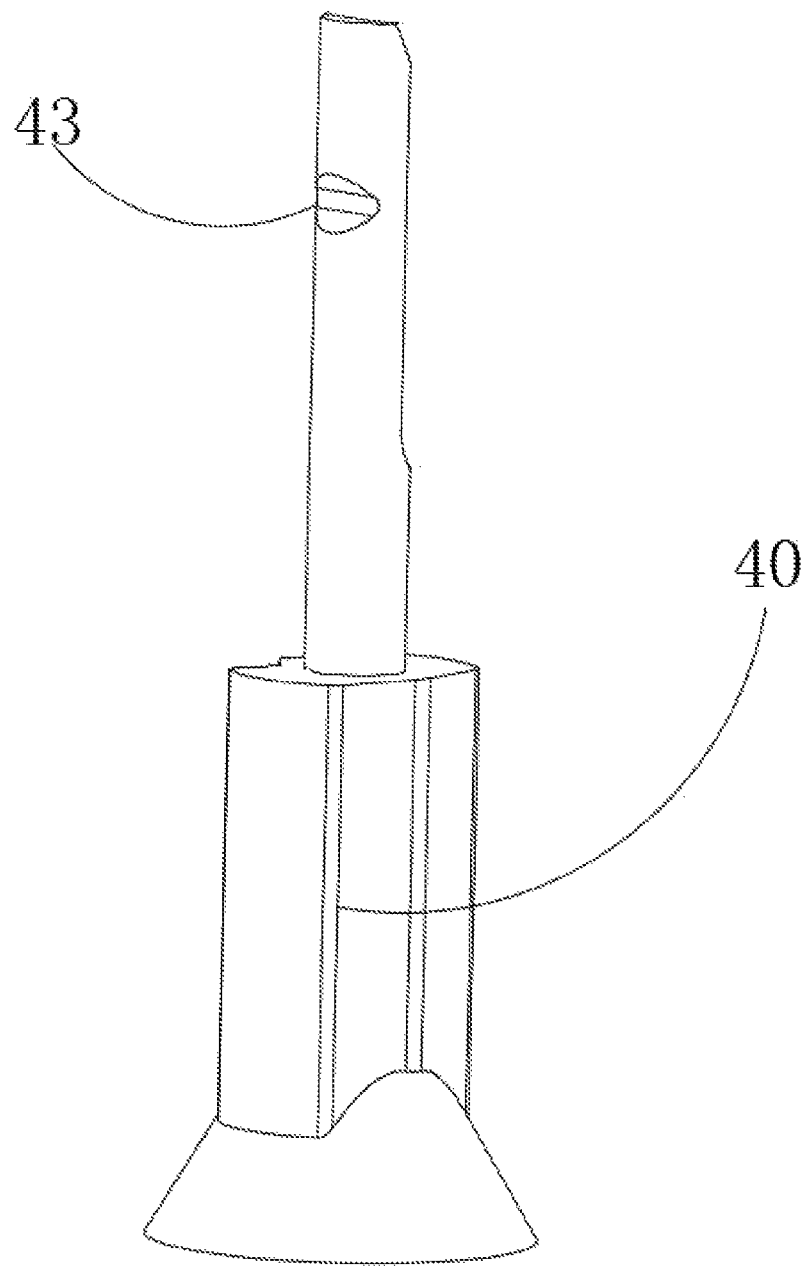
FIG. 12 illustrates another structural schematic diagram of the main engine according to the embodiment of the disclosure.

Referring to FIG. 8 and FIG. 9, in the embodiment, preferably, the top of the toothbrush handle 10 defines a top cavity 230. A second lug boss 233 is disposed in the top cavity 230. The second lug boss 233 defines a pin through hole 234. An upper part of the top cavity 230 is provided with a third limiting bone 231 and a fourth limiting bone 232. The bristle limiting bone 204 is disposed between the third limiting bone 231 and fourth limiting bone 232.

The bristle limiting bone 204 interacts with the third limiting bone 231 and the fourth limiting bone 232 to limit a rotation angle of the bristle combination body 201, thereby preventing the rotation angle from being too large.

In the embodiment, preferably, the top of the toothbrush handle 10 defines a groove 237 located at a back of the top cavity 230. Specifically, the groove 237 may be a circular groove, and the groove 237 corresponds to the second lug boss 233 in position.

In the embodiment, preferably, two sides of the groove 237 are provided with a first drainage hole 235 and a second drainage hole 236.

In the embodiment, preferably, a lower part of the toothbrush handle 10 defines a first buckle hole 241 and a second buckle hole 242 on both sides.

In the embodiment, a top surface of the second lug boss 233 is configured to install the bristle combination body 201. The second lug boss 233 is internally provided with the pin through hole 234 for installing the pin 23. The pin through hole 234 has a diameter of 1.44 mm and maintains a certain gap with the pin 23, so that the pin 23 can rotate and move smoothly within the pin through hole 234.

In the toothbrush handle 10, the two sides of the back of the second lug boss 233 are provided with the first drainage hole 235 and the second drainage hole 236. The two drainage holes are configured to drain the mouthwash during brushing, thereby preventing the accumulation of liquid inside the toothbrush head 20 from causing health problems.

In the toothbrush handle 10, the back of the second lug boss 233 is provided with the groove 237. The groove 237 is configured to install a pin cap for the pin 23. The pin cap can be disposed in the groove 237 to prevent excessive contact (the excessive contact has a negative impact during rotation) between the pin cap and the oral mucosa. At the same time, the position of the pin 23 is fixed by the pin cap to prevent the bristle combination body 201 from sliding from the toothbrush handle 10.

Referring to FIG. 1, FIG. 2, FIG. 5, FIG. 6, and FIG. 7, in the embodiment, preferably, the bristle combination body 201 further includes: a positioning step 205, and the first lug boss 202 is disposed on the positioning step 205.

The positioning step 205 can help achieve automatic assembly of the toothbrush replacement head body 100, and can also increase the structural strength of the toothbrush head 20.

In the embodiment, preferably, the bristle combination body 201 further includes: a bristle top cover 21 and a bristle bottom cover 22. The bristle top cover 21 defines bristle holes 212. The bristle bottom cover 22 defines a glue-overflow groove 222.

The bristle combination body 201 includes: the bristle top cover 21 and the bristle bottom cover 22. The bristle top cover 21 is provided with a top cover connecting surface 211, the bristle holes 212, and hot-melt adhesive nails 213. A front surface of the bristle bottom cover 22 is provided with a bottom cover connecting surface 221, the glue-overflow groove 222, and an ultrasonic line 223.

In the embodiment, the bristles 214 are respectively filled in the bristle holes 212, and the bristles 214 and the hot-melt glue nails 213 are melted into a whole through a high-temperature hot-melt process, so that the copper-free bristle planting is realized.

The top cover connecting surface 211 of the bristle top cover 21 fits with the bottom cover connecting surface 221 of the bristle bottom cover 22. The bottom cover connecting surface 221 of the bristle bottom cover 22 is provided with the ultrasonic line 223, so that the bristle top cover 21 is configured to be fused with the bristle bottom cover 22 through an ultrasonic technology to assemble the toothbrush head 20.

In the embodiment, preferably, an inner side of the bottom cover connecting surface 221 of the bristle bottom cover 22 is provided with the glue-overflow groove 223, and the glue-overflow groove 223 is configured to avoid a larger gap between the bristle top cover 21 and the bristle bottom cover 22 when the bristle top cover 21 is fused with the bristle bottom cover 22.

Referring to FIG. 1 to FIG. 4, in the embodiment, preferably, the driving gear 102 is disposed on the top of the rotating shaft 11. The driving gear 102 includes: a first tooth column 111 and a second tooth column 112. The driving gear 102 defines a tooth groove 113 between the first tooth column 111 and the second tooth column 112. The driven gear 206 is meshed with the rotating shaft 11 through the tooth groove 113.

The first tooth column 111, the second tooth column 112, and the tooth groove 113 form the driving gear 102. The driving gear 102 cooperates with the driven gear 206 to enable the bristle combination body 201 to be driven by the rotating shaft 11.

Referring to FIG. 1 to FIG. 4, in the embodiment, preferably, the top of the rotating shaft 11 is provided with a rotating pivot 114, and the rotating pivot 114 is disposed below the driving gear 102.

In the embodiment, preferably, a top of the toothbrush handle 10 defines a pivot hole 16 therein, and the rotating pivot 114 is disposed in the pivot hole 16.

The rotating pivot 114 is disposed below the driving gear 102. After the rotating pivot 114 is installed, the rotating pivot 114 enters into the pivot hole 16. The rotating pivot 114 serves as a central axis pivot when the rotating shaft 11 is rotated, and the rotating pivot 114 is located on a centerline of the rotation shaft 11.

Referring to FIG. 1, FIG. 2, FIG. 3, FIG. 4, FIG. 11, and FIG. 12, in the embodiment, preferably, the rotating shaft 11 is provided with an elastic sheet 115, and the elastic sheet 115 is provided with an elastic protrusion 1151.

The lower part of the rotating shaft 11 is provided with the elastic sheet 115, and the elastic sheet 115 is provided with the elastic protrusion 1151. When the electric toothbrush rotating replacement head device is in use, the main engine 40 is provided, and the main engine 40 includes: a main shaft 41. The main shaft 41 defines a main shaft flat groove 42 and a main shaft clamping groove 43. The elastic protrusion 1151 is configured to be snapped with the main shaft clamping groove 43, thereby preventing the main shaft 41 from detaching from the toothbrush handle 10.

In the embodiment, preferably, a main shaft installation hole 117 is defined at a central position of a lower part of the rotating shaft 11, and the main shaft installation hole 117 is configured to install the main shaft 41 of the main engine 40.

The main shaft installation hole 117 is defined at the central position of the lower part of the rotating shaft 11, and the main shaft installation hole 117 is configured to install the main shaft 41 of the main engine 40. An assembly flat part 116 is disposed in the main shaft installation hole 117, and the assembly flat part 116 is configured to contact the main shaft flat groove 42 closely. The assembly flat part 116 and the main shaft flat groove 42 are configured to tighten a connection between the rotating shaft 11 and the main shaft 41, thereby transmitting torque and force effectively.

In the embodiment, preferably, two sides of a bottom of the rotating shaft 11 are respectively provided with a first limiting bone 1181 and a second limiting bone 1182.

The two sides of the bottom of the rotating shaft 11 are respectively provided with the first limiting bone 1181 and the second limiting bone 1182. The first limiting bone 1181 and the second limiting bone 1182 are configured to cooperate with limiting blocks, thereby limiting a rotation angle of the rotating shaft 11.

Referring to FIG. 1, FIG. 2, FIG. 3, FIG. 4, FIG. 8, FIG. 9, and FIG. 10, in the embodiment, preferably, a bottom of the toothbrush handle 10 is provided with a tail plug 30, and the tail plug 30 is provided with a first limiting block 33 and a second limiting block 34. The first limiting block 33 corresponds to the first limiting bone 1181 in position. The second limiting block 34 corresponds to the second limiting bone 1182 in position. The first limiting block 33 is snapped with the first limiting bone 1181, and the second limiting block 34 is snapped with the second limiting bone 1182.

In the embodiment, preferably, the tail plug 30 includes a first elastic sheet 31 and a second elastic sheet 32. The first elastic sheet 31 is snapped with the bottom of the toothbrush handle 10 through the first buckle hole 241, and the second elastic sheet 32 is snapped with the bottom of the toothbrush handle 10 through the second buckle hole 242.

Referring to FIG. 1 and FIG. 8 to FIG. 12, in the embodiment, the tail plug 30 is installed in a tail plug installation groove 13. The first elastic sheet 31 is snapped with the first buckle hole 241 of the toothbrush handle 10. The second elastic sheet 32 is snapped with the second buckle hole 242 of the toothbrush handle 10, thereby tightening a connection between the tail plug 30 and the toothbrush handle 10.

The cavity 101 of the toothbrush handle 10 defines a main engine installation hole 15 for installing the main engine 40. A main shaft through hole 14 is defined in a middle of the cavity 101, and the main shaft through hole 14 is configured to be passed through by the main shaft 41.

Figure 3:
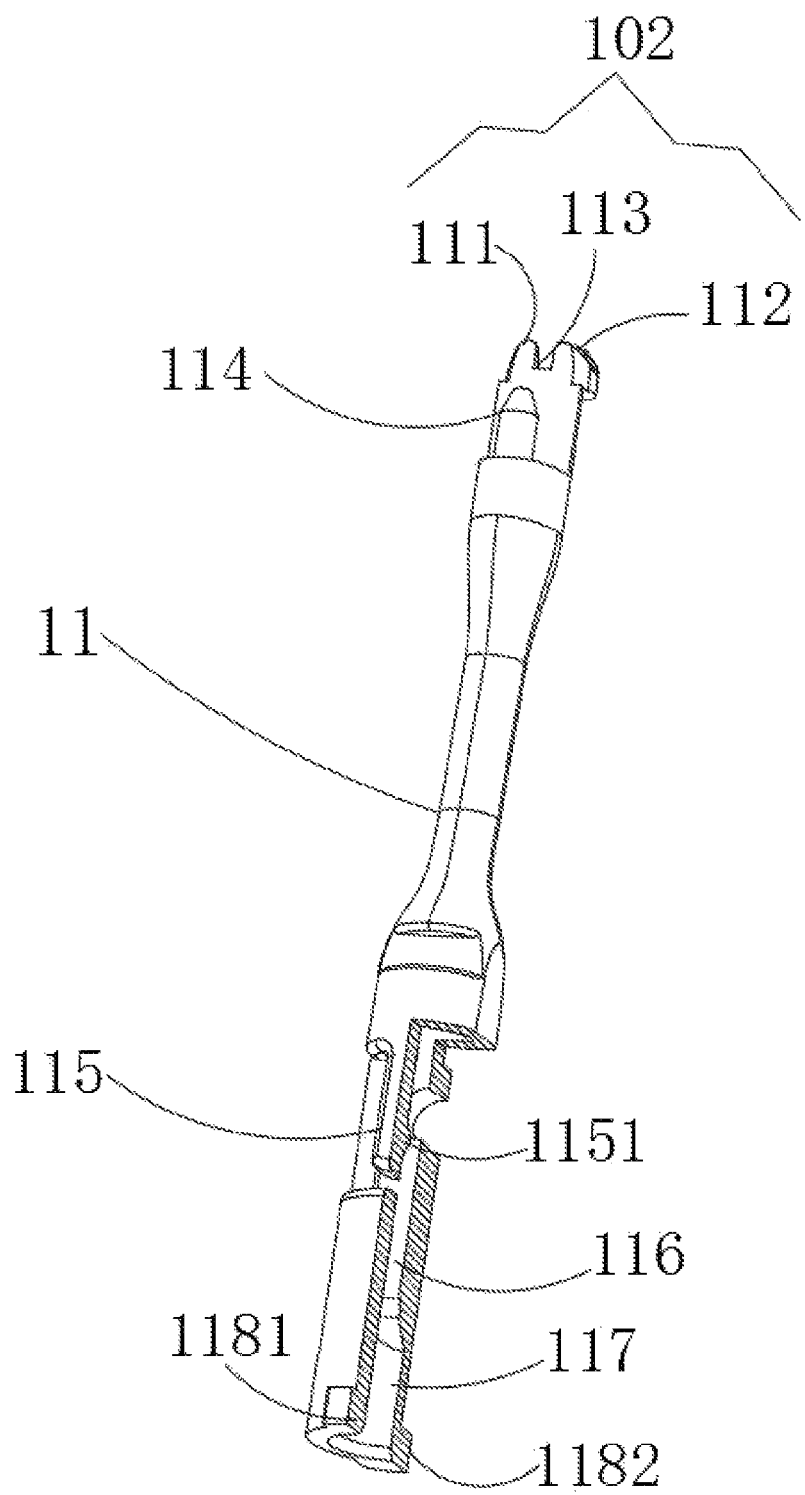
FIG. 3 illustrates a structural schematic diagram of a rotating shaft of the electric toothbrush rotating replacement head device according to the embodiment of the disclosure.
Figure 4:
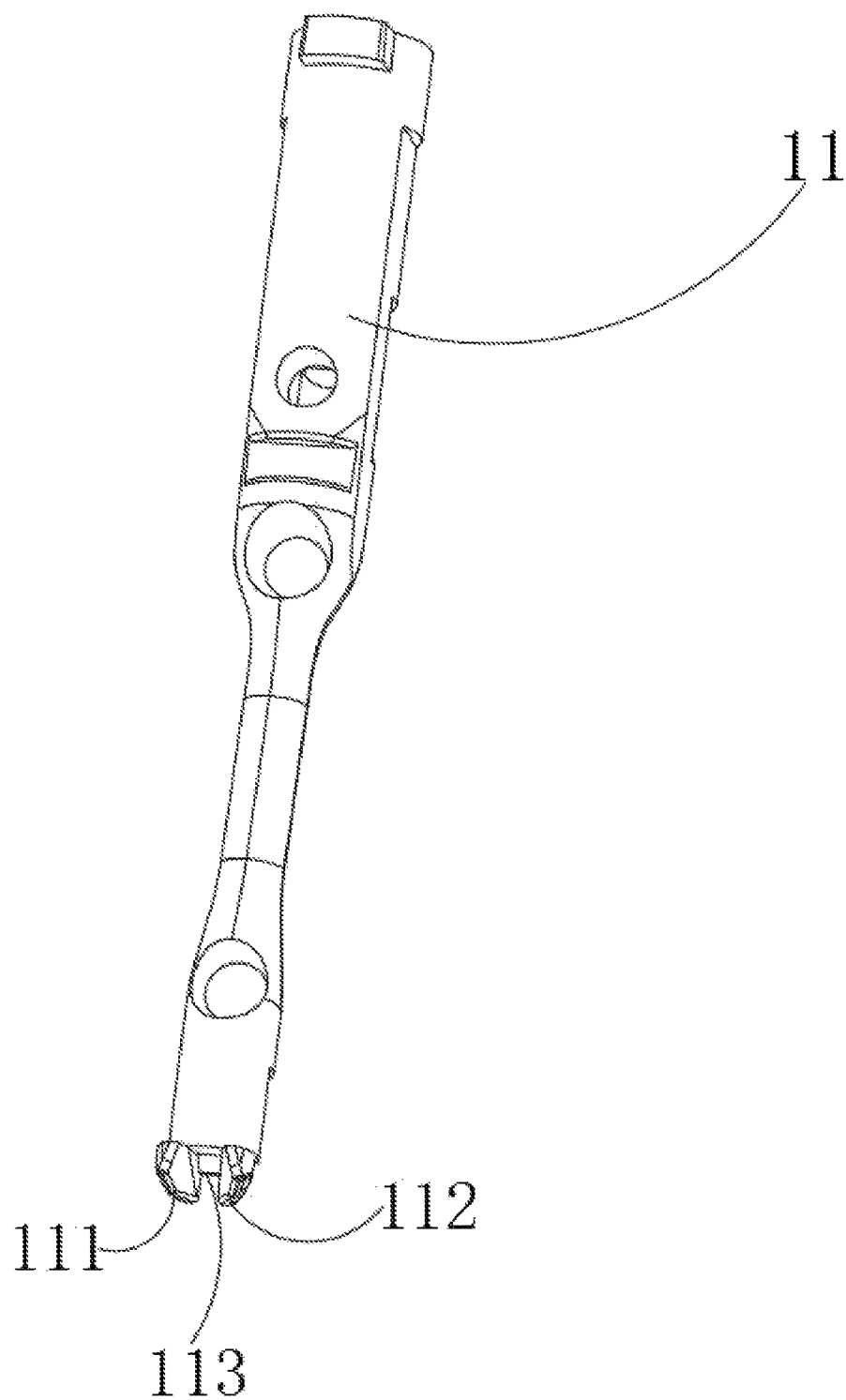
FIG. 4 illustrates another structural schematic diagram of a rotating shaft of the electric toothbrush rotating replacement head device according to the embodiment of the disclosure.
Figure 5:
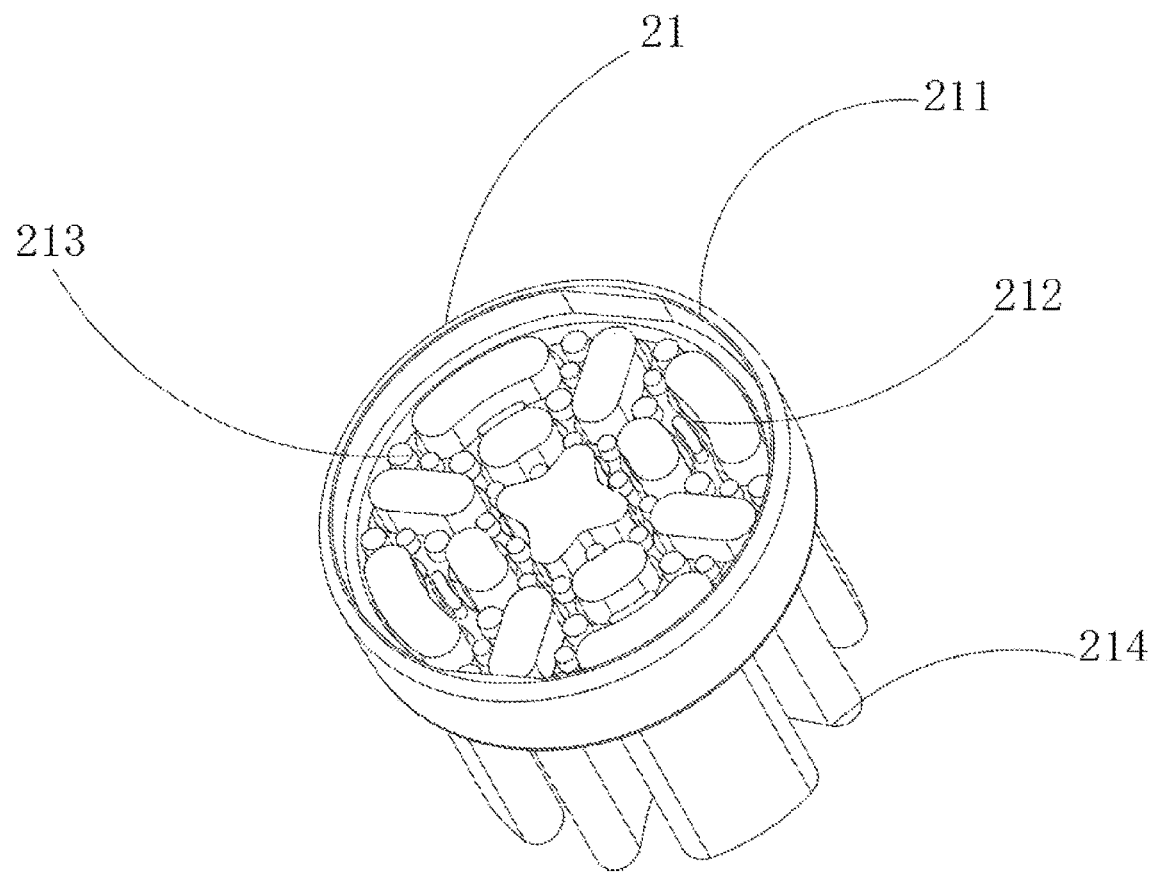
FIG. 5 illustrates a structural schematic diagram of a bristle top cover of the electric toothbrush rotating replacement head device according to the embodiment of the disclosure.
Figure 6:
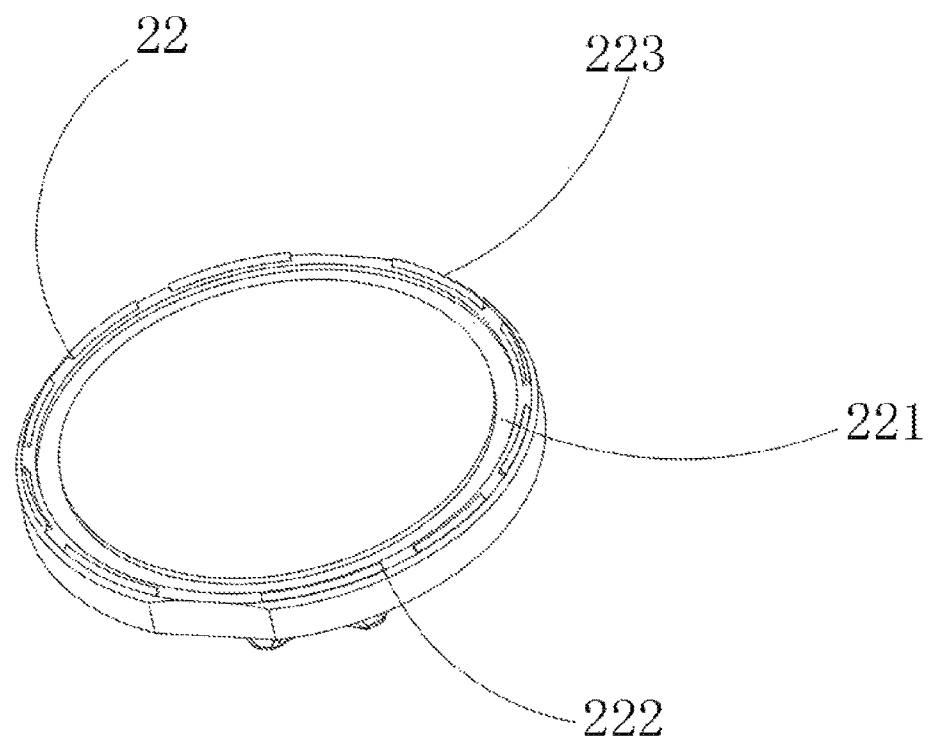
FIG. 6 illustrates a structural schematic diagram of a bristle bottom cover of the electric toothbrush rotating replacement head device according to the embodiment of the disclosure.
Figure 7:
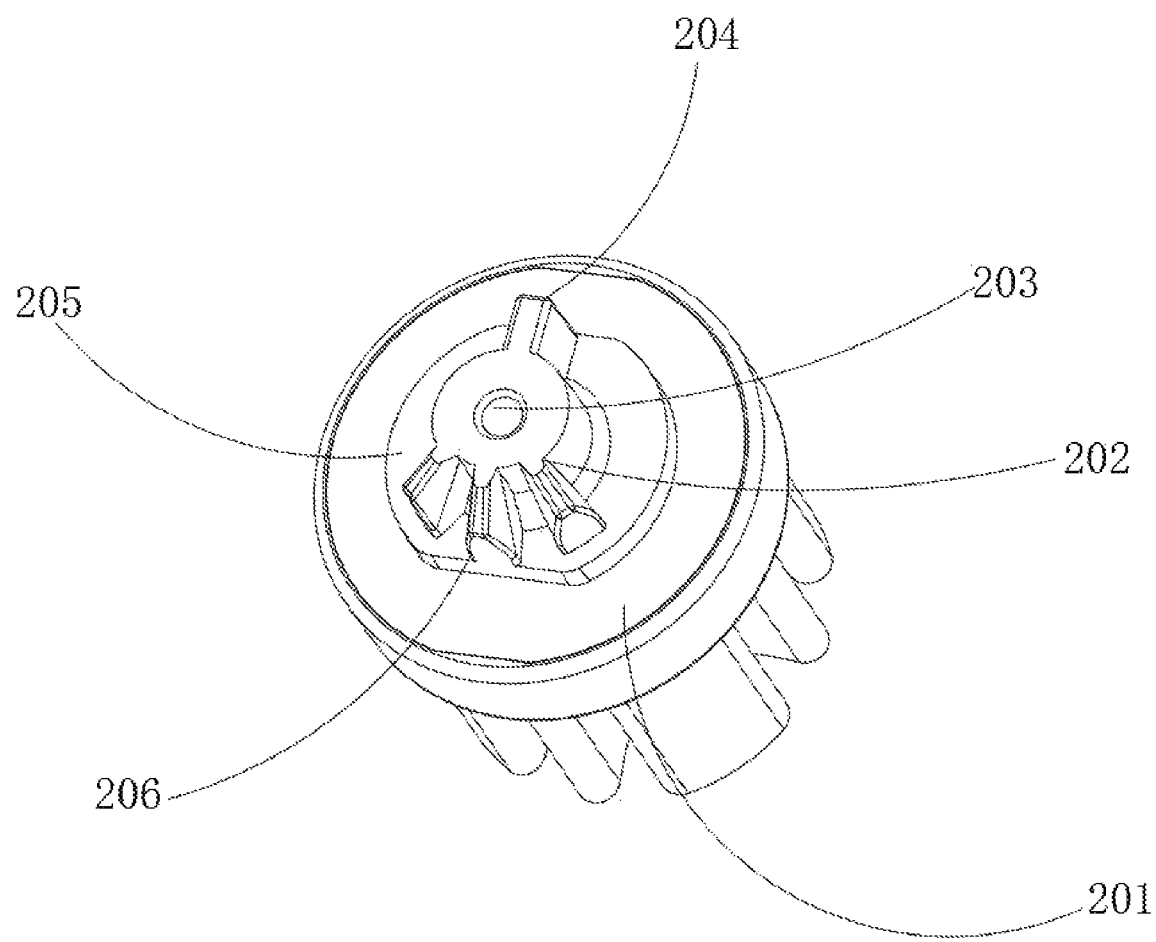
FIG. 7 illustrates a structural schematic diagram of a bristle combination body of the electric toothbrush rotating replacement head device according to the embodiment of the disclosure.

Referring to FIG. 3, the lower part of the rotating shaft 11 is further provided with the assembly flat part 116 and the main shaft installation hole 117. When the electric toothbrush rotating replacement head device is assembled, the main engine 40 enters into the main engine installation hole 15, the main shaft 41 enters into the main shaft installation hole 117, and the main shaft flat groove 43 contacts the assembly flat part 116 closely.

When the main engine 40 is turned on, the main shaft 41 rotates in a reciprocating manner to drive the rotating shaft 11 to rotate in a reciprocating manner. The driving gear 102 of the rotating shaft 11 drives the bristle combination body 201 to rotate in a reciprocating manner, and the bristles 214 on the bristle combination body 201 rotate in a reciprocating manner to clean teeth.

The electric toothbrush rotating replacement head device of the disclosure optimizes the design of related art, has simpler structures, a simpler installation, higher transmission efficiency, and a better cleaning effect.

The above are only some embodiments of the disclosure and do not limit the scope of protection of the disclosure. Any equivalent structural changes made by using the description and attached drawings of the disclosure, direct applications, and indirect applications in other related technical fields should belong to the scope of protection of the disclosure.

What is claimed is:

1. An electric toothbrush rotating replacement head device, comprising: a toothbrush replacement head body;
wherein the toothbrush replacement body comprises: a toothbrush handle and a toothbrush head; the toothbrush handle defines a cavity, and the toothbrush head is disposed on a top of the cavity; a rotating shaft is disposed in the cavity; the toothbrush head comprises: a bristle combination body; a shape of the bristle combination body corresponds to a shape of the toothbrush head; the bristle combination body comprises: a first lug boss and a pin, the first lug boss defines a pin installation hole, and the pin is in an interference fit with the pin installation hole; a top edge of the first lug boss is provided with a bristle limiting bone, and a bottom of the first lug boss is provided with a driven gear;

wherein a top of the rotating shaft is provided with a driving gear, and the driving gear is meshed with the driven gear; and the top of the rotating shaft is further provided with a rotating pivot, and the rotating pivot is disposed below the driving gear;

wherein an elastic sheet is directly connected with the rotating shaft, and the elastic sheet extends from an end of the rotating shaft to which it is directly connected along a direction facing away from the rotating pivot, and an end of the elastic sheet facing away from the rotating pivot is provided with an elastic protrusion configured to be snapped with a main shaft clamping groove of a main shaft;

wherein a first limiting bone and a second limiting bone are directly connected with a bottom of the rotating shaft and protrude outward relative to the rotating shaft; and the first limiting bone, the elastic sheet, and the rotating pivot are located at a same side of the rotating shaft; and wherein the driven gear is directly connected with the first lug boss, the bristle limiting bone is directly connected with the first lug boss and extends from the first lug boss along a direction facing away from the driven gear; a top of the toothbrush handle defines a top cavity, a second lug boss is disposed in the top cavity, the second lug boss defines a pin through hole, a third limiting bone and a fourth limiting bone are directly connected with an inner wall of the toothbrush hand surrounding the top cavity and spaced out the second lug boss, the third limiting bone and the fourth limiting bone protrude inward relative to the inner wall of the toothbrush hand, and the bristle limiting bone is disposed between the third and fourth limiting bones; and the pin passes through the pin through hole and the pin installation hole to connect the bristle combination body with the toothbrush hand.

2. The electric toothbrush rotating replacement head device as claimed in claim 1, wherein the bristle combination body further comprises: a positioning step, and the first lug boss is disposed on the positioning step.

3. The electric toothbrush rotating replacement head device as claimed in claim 2, wherein the bristle combination body further comprises: a bristle top cover and a bristle bottom cover; the bristle top cover defines bristle holes; and the bristle bottom cover defines a glue-overflow groove.

4. The electric toothbrush rotating replacement head device as claimed in claim 3, wherein the bristle top cover is provided with a top cover connecting surface surrounding the bristle holes; bristles are respectively disposed in the bristle holes, and hot-melt adhesive nails are disposed between the bristles, and the hot-melt adhesive nails are configured to be melted to fix the bristles on the bristle top cover; and the bristle bottom cover is provided with a bottom cover connecting surface connected with the top cover connecting surface; ultrasonic lines are disposed outside the bottom cover connecting surface and spaced apart from each other; and the ultrasonic lines are configured to be fused to fix the bristle bottom cover on the bristle top cover.

5. The electric toothbrush rotating replacement head device as claimed in claim 1, wherein the driving gear disposed on the top of the rotating shaft comprises: a first tooth column and a second tooth column; the driving gear defines a tooth groove between the first tooth column and the second tooth column; and the driven gear is meshed with the rotating shaft through the tooth groove.

6. The electric toothbrush rotating replacement head device as claimed in claim 1, wherein the top of the toothbrush handle defines a pivot hole therein, and the rotating pivot is disposed in the pivot hole.

7. The electric toothbrush rotating replacement head device as claimed in claim 1, wherein a central position of a lower part of the rotating shaft defines a main shaft installation hole configured to install the main shaft of a main engine.

8. The electric toothbrush rotating replacement head device as claimed in claim 7, wherein the lower part of the rotating shaft is provided with an assembly flat part configured to be in contact with a main shaft flat groove of the main shaft of the main engine.

9. The electric toothbrush rotating replacement head device as claimed in claim 1, wherein the top of the toothbrush handle defines a groove located at a back of the top cavity, and the groove corresponds to the second lug boss in position.

10. The electric toothbrush rotating replacement head device as claimed in claim 9, wherein two sides of the groove are provided with a first drainage hole and a second drainage hole respectively.

11. The electric toothbrush rotating replacement head device as claimed in claim 10, wherein a lower part of the toothbrush handle defines a first buckle hole and a second buckle hole.

12. The electric toothbrush rotating replacement head device as claimed in claim 11, wherein a bottom of the toothbrush handle is provided with a tail plug, and the tail plug is provided with a first limiting block and a second limiting block; the first limiting block corresponds to the first limiting bone in position, the second limiting block corresponds to the second limiting bone in position, the first limiting block is snapped with the first limiting bone, and the second limiting block is snapped with the second limiting bone.

13. The electric toothbrush rotating replacement head device as claimed in claim 12, wherein the tail plug comprises: a first elastic sheet and a second elastic sheet; the first elastic sheet is snapped with the bottom of the toothbrush handle through the first buckle hole, and the second elastic sheet is snapped with the bottom of the toothbrush handle through the second buckle hole.

14. An electric toothbrush rotating replacement head device, comprising:

a toothbrush head, comprising: a first lug boss and a pin; wherein the first lug boss defines a pin installation hole, and a side of the first lug boss is provided with a driven gear;

a toothbrush handle, connected to the toothbrush head and defining a top cavity; wherein the toothbrush handle comprises: a second lug boss disposed in the top cavity, and the second lug boss defines a pin through hole; and a rotating shaft, disposed in the toothbrush handle; wherein a top of the rotating shaft is provided with a driving gear meshed with the driven gear, thereby enabling the rotating shaft to drive the toothbrush head;

wherein the first lug boss is disposed in the top cavity and abuts against the second lug boss; and the pin penetrates the pin through hole of the second lug boss into the pin installation hole of the first lug boss, and the pin is in an interference fit with the pin installation hole;

wherein the driven gear is directly connected with the first lug boss, a bristle limiting bone is directly connected with the first lug boss and extends from the first lug boss along a direction facing away from the driven gear; and two limiting bones are directly connected with an inner wall of the toothbrush hand surrounding the top cavity and spaced out the second lug boss, the two limiting bones protrude inward relative to the inner wall of the toothbrush hand, and the bristle limiting bone is disposed between the two limiting bones; and wherein the electric toothbrush rotating replacement head device further comprises: a bristle top cover and a bristle bottom cover; the bristle top cover defines bristle holes installed with bristles therein, and hot-melt adhesive nails are disposed between the bristles and configured to be melted to fix the bristles on the bristle top cover; and the bristle bottom cover defines a glue-overflow groove, ultrasonic lines surround the glue-overflow groove and are spaced apart from each other, and the ultrasonic lines are configured to be fused to fix the bristle bottom cover on the bristle top cover;

wherein an outer surface of the rotating shaft is provided with a first limiting bone and a second limiting bone;

wherein the electric toothbrush rotating replacement head device further comprises: a tail plug disposed at a bottom of the toothbrush handle; the tail plug comprises: a first limiting block and a second limiting block, and the first limiting block is snapped with the first limiting bone, and the second limiting block is snapped with the second limiting bone;

wherein the top of the rotating shaft is further provided with a rotating pivot, and the rotating pivot is disposed below the driving gear; and wherein an elastic sheet is directly connected with the rotating shaft, and the elastic sheet extends from an end of the rotating shaft to which it is directly connected along a direction facing away from the rotating pivot, and an end of the elastic sheet facing away from the rotating pivot is provided with an elastic protrusion configured to be snapped with a main shaft clamping groove of a main shaft; the first limiting bone and the second limiting bone protrude outward relative to the rotating shaft; and the first limiting bone, the elastic sheet, and the rotating pivot are located at a same side of the rotating shaft.

15. The electric toothbrush rotating replacement head device as claimed in claim 14, wherein the toothbrush handle defines a first drainage hole and a second drainage hole located at two sides of the second lug boss.

\* \* \* \* \*